United States Patent [19]

Nishiyama

[11] Patent Number: 5,208,588
[45] Date of Patent: May 4, 1993

[54] METHOD AND APPARATUS FOR CONTINUOUSLY SCROLLING LARGE SCALE PICTURE

[75] Inventor: Kazuyoshi Nishiyama, Tokyo, Japan

[73] Assignee: Kabushiki Kaisha Toshiba, Kawasaki, Japan

[21] Appl. No.: 683,067

[22] Filed: Apr. 10, 1991

[30] Foreign Application Priority Data

Apr. 10, 1990 [JP] Japan .................................. 2-94713

[51] Int. Cl.$^5$ .............................................. G09G 1/06
[52] U.S. Cl. ................................... 340/724; 340/723; 340/798
[58] Field of Search ............... 340/726, 724, 723, 747, 340/750, 799, 798; 382/41, 45

[56] References Cited

U.S. PATENT DOCUMENTS 4,642,790 2/1987 Minshull et al. .................... 340/724
4,790,025 12/1988 Inoue et al. ......................... 340/724

Primary Examiner—Tommy P. Chin
Assistant Examiner—A. Au
Attorney, Agent, or Firm—Oblon, Spivak, McClelland, Maier & Neustadt

[57] ABSTRACT

A method for continuously scrolling a large scale picture, comprising scrolling picture data of first partial picture memory in a predetermined direction, the first picture memory having a region with a position and a size, reserving second partial picture memory having a region of a different position and a predetermined size in the predetermined direction of scrolling, the region of the second partial picture memory overlapping that of the first partial picture memory, changing display data from the first partial picture memory to the second partial picture memory at the time when scrolled position become near to a boundary region of the first partial picture memory, continuously scrolling picture data of the second memory.

5 Claims, 9 Drawing Sheets

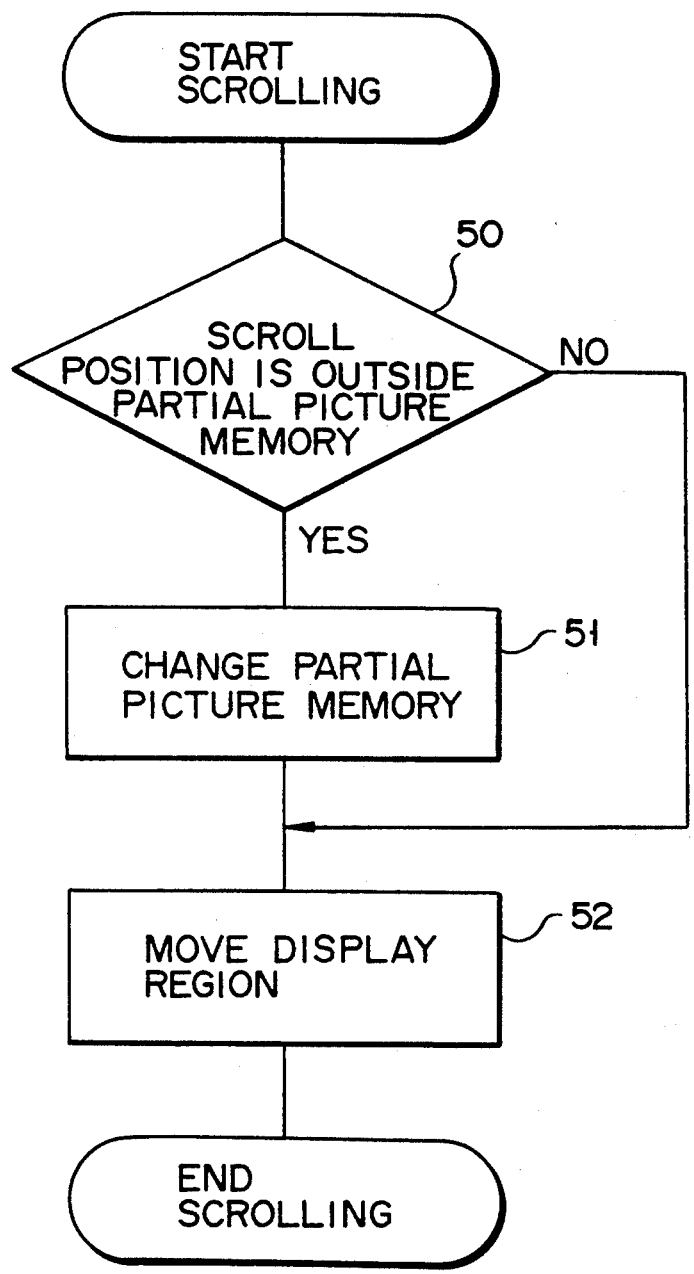
F I G. 9

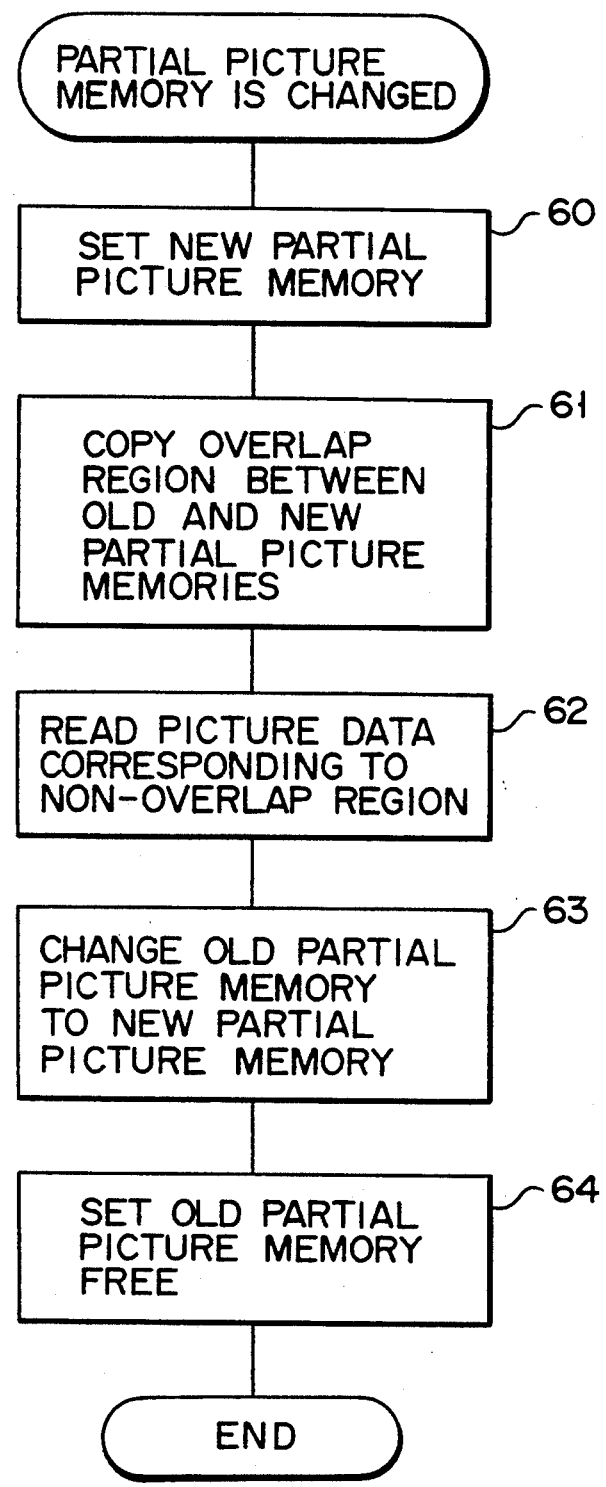
F I G. 10

METHOD AND APPARATUS FOR CONTINUOUSLY SCROLLING LARGE SCALE PICTURE

BACKGROUND OF THE INVENTION

1. Field of the Invention

The present invention relates to a method for continuously scrolling a large scale picture and its apparatus.

2. Description of the Related Art

There has been developed equipments serving as a multimedia and processing information in which pictures, CAD figures, characters, and numerical data are mixed. It has been required that a large scale picture such as a map picture as picture data is processed by such equipments.

In the conventional equipments, since a picture input by a scanner was used as a unit picture, it was possible to perform the continuous scrolling in the input unit picture. However, it was difficult to continuously scroll the picture over the other input unit picture. Moreover, it was necessary to provide a special hardware for processing the picture data.

Conventionally, in order to continuously scroll the large scale picture, there were needed a picture memory with a large capacity for retaining picture data to be displayed and a special hardware for processing the picture data.

SUMMARY OF THE INVENTION

A first object of the present invention is to provide a method for continuously scrolling a large scale picture wherein a large scale picture is continuously scrolled at a high speed by use of a hardware source used in a general computer.

A second object of the present invention is to provide an apparatus for continuously scrolling a large scale picture wherein a large scale picture is continuously scrolled at a high speed by use of a hardware source used in a general computer.

To attain the above first object, a method for continuously scrolling a large scale picture of the present invention comprises the steps of:

extracting a partial picture of a part of a large scale picture from picture memory means storing a plurality of unit pictures, which forms the large scale picture and be respectively corresponded to predetermined addresses, and storing the extracted partial picture into a first partial picture memory means, the first partial picture memory means having a region with a position and a size, which are relatively defined based on coordinate axes of the large scale picture;

reserving second partial picture memory means having a different position and a size, which are relatively defined based on the coordinate axe of the large scale picture, the second partial picture memory means having a region overlapping the first partial picture memory means;

calculating the position and the size of a region where the first and second partial picture memory means overlap each other, and those of a region where the first and second partial picture memory means do not overlap each other;

copying picture data of the first partial picture memory means corresponding the region where the first and second partial picture memory means overlap each other, to a corresponding region of the second partial picture memory means;

searching the unit partial pictures forming the region of the second partial picture memory means which does not overlap the first picture memory means based on the respective addresses of the plurality of the unit pictures forming the large scale picture;

storing the searched unit pictures to the corresponding position of the second partial picture memory means and operating the second partial picture memory means in which all picture data to be stored are stored, in place of the operation of the first partial picture memory means; and displaying the content of the second partial picture memory means, and scrolling the displayed content.

To attain the above second object, an apparatus for continuously scrolling a large scale picture of the present invention comprises:

picture memory means for dividing a large scale picture into a plurality of unit pictures, and storing the plurality of unit pictures to the respective predetermined addresses;

first partial picture memory means for storing a partial picture of a part of the large scale picture formed by the unit pictures, the first partial picture memory means having a region with a position and a size, which are relatively defined based on coordinate axes of the large scale picture;

second partial picture memory means having a different position and a size, which are relatively defined based on the coordinate axes of the large scale picture, the second partial picture memory means having a region overlapping the first partial picture memory means;

geometrical calculation means for calculating the position and the size of the region where the first and second partial picture memory means overlap each other, and those of the region where first and second partial picture memory means do not overlap each other;

copy means for copying picture data of the first partial picture memory means corresponding the region where the first and second partial picture memory means overlap each other to a corresponding region of the second partial picture memory means;

search means for searching the unit pictures forming the region of the second partial picture means which does not overlap the first partial picture memory means based on the respective addresses of the plurality of the unit pictures forming the large scale picture;

picture memory control means for storing the searched unit pictures to the position corresponding to the second partial picture memory means and controlling the second partial picture memory means, in which all picture data to be stored are stored, to be set in an operation mode in place of the operation of the first partial picture memory means; and display means for displaying either the content of the first partial picture memory means or that of the second partial picture memory means, and scrolling the displayed content.

In the above-structured apparatus for continuously scrolling a large scale picture, picture data in a specific partial picture memory is displayed in display means, and the displayed picture data can be continuously scrolled within the range of the picture image stored in the specific partial picture memory.

Moreover, it is possible to continuously scroll the picture data stored in the different partial picture memory from the picture data stored in the specific partial picture memory. In this case picture data stored in the specific partial picture memory is first scrolled. Then, a new partial picture memory for storing picture data which is formed by moving the presently used specific partial picture memory by a predetermined number of unit pictures in the scroll direction immediately before the display region exceeds the range of the specific partial picture memory. The overlapping portion of the positional regions of two partial picture memories is calculated by geometrical calculation means. Regarding picture data where the positions of the partial picture memories are overlapped, picture data of the specific partial picture memory, which is presently used, is copied to a new partial picture memory by raster control means. Also, regarding the portion, which is not overlapped, unit pictures necessary for constituting such a portion is searched based on the geometrical calculation by unit picture search means, and the searched unit pictures are read in the new partial picture memory from a picture memory means. Then, the new partial picture memory is used at the time when the specific partial picture memory exceeds the range of the specific partial picture memory. At the same time with the use of new partial picture memory, the specific partial picture memory, which is not used, is released.

As mentioned above, according to the method for continuously scrolling a large scale picture of the present invention, a unit picture in the scroll direction is consequently read in a partial picture memory from a picture memory means, thereby scrolling the unit picture. Therefore, it is possible to continuously scroll the large scale picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 9 is a flow chart showing a continuously scrolling; and

FIG. 10 is a flow chart showing a change of the partial picture memory.

DETAILED DESCRIPTION OF HE PREFERRED EMBODIMENTS

An embodiment of the present invention will be explained with reference to the drawings.

Figure 1:
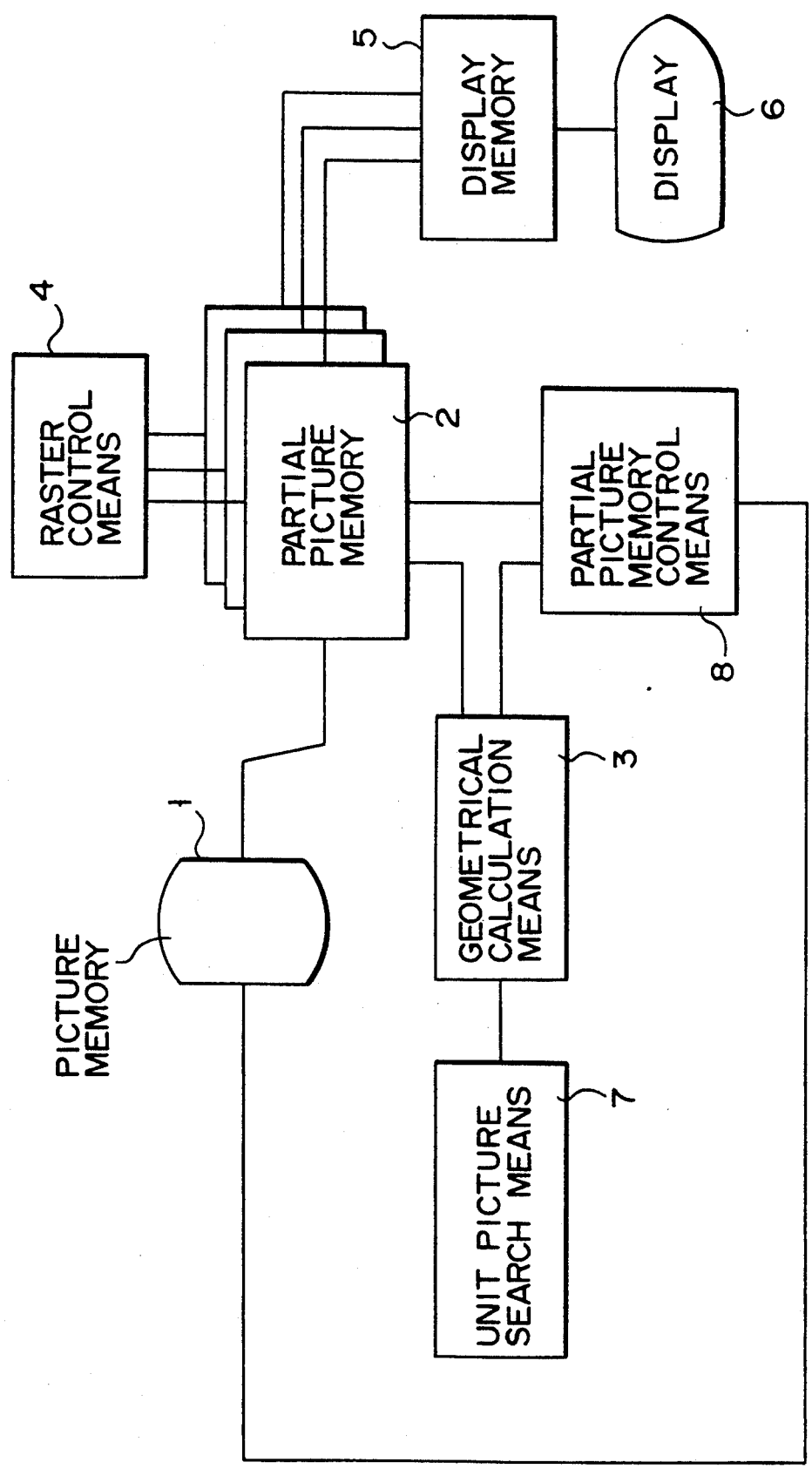
FIG. 1 is a block diagram of a scroll apparatus according to an embodiment of the present invention.

FIG. 1 is a block diagram showing a schematic structure of an apparatus for continuously scrolling a large scale picture according to the embodiment of the present invention.

The continuously scrolling apparatus comprises a picture or image memory device 1, a partial picture memory (partial image memory 2, geometrical calculation means 3, raster control means 4, a display memory 5, a display device 6, unit picture search means 7, and picture memory control means 8.

The picture memory device 1 stores a plurality of unit pictures forming a large scale picture. The unit picture is formed of a rectangular region having the same size, such as 512×512 pixels. The large scale picture is divided into the unit pictures. The picture memory device 1 is, for example, a magnetic disc device.

The partial picture memory 2 collects a predetermined number of unit pictures stored in the picture memory device 1 and stores picture data forming a part of the large scale picture. For example, the partial picture memory 2 is provided in an imaginary memory space of a computer. In the present apparatus, at least two partial picture memories are provided.

Geometrical calculation means 3 performs a calculation of the positional relationship between the regions of at least two different partial picture memories 2. In other words, geometrical calculation means 3 determines an overlapping state of the address region of the different partial picture memories 2.

Raster control means 4 copies picture data of one partial picture memory to an arbitrary region of the other partial picture memory 2, and obtains logical OR or AND of one picture data and the other picture data. In other words, raster control means 4 performs the so-called raster control. Raster control means 4 is realized by a program in the computer.

The display memory 5 has a function storing picture data to be displayed in the display 6. The picture data of the display memory 5 is displayed in the display 6 as it is. The display memory 5 of this embodiment is realized by a frame buffer of a bit map display.

Unit picture search means 7 searches unit pictures corresponding to address data in no overlapping region between two different partial picture means 2 which has been obtained by geometrical calculation means 3. Address data of the unit picture forming the large scale picture is input in unit picture search means 7, in advance and stored therein.

Picture memory control means 8 stores in a table form the position (address) of the unit picture included in the partial picture memory 2 and the position of the partial picture memory 2 with respect to the large scale picture. Moreover, picture memory control means 8 reads a necessary unit picture from the picture memory device 1 so as to copy picture data of one partial picture memory to the other partial picture memory, and exchange one partial picture memory to the other partial picture memory and send picture data of the other partial picture memory to display memory 5.

Figure 2:
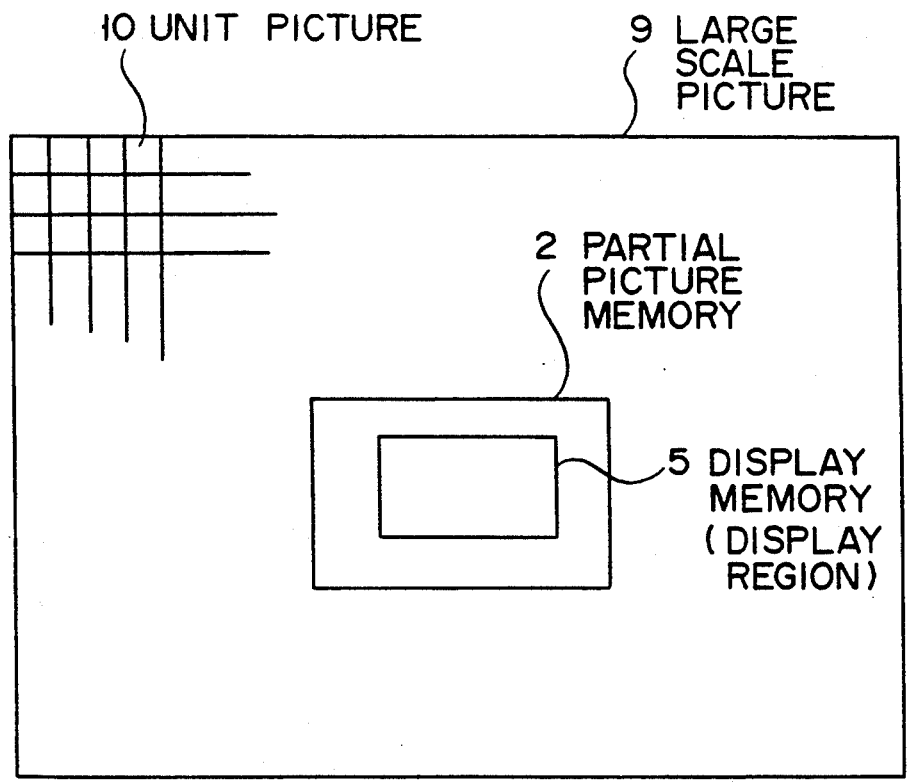
FIG. 2 is a view showing a relationship among a large scale picture, a partial picture memory, and a display memory.

FIG. 2 conceptually shows the positional relationship among a large scale picture 9, the partial picture memory 2, a unit picture 10, and the display memory 5. The large scale picture 9 is formed as aggregation of the unit pictures 10. The unit pictures 10 are rectangular pictures whose sizes are all the same. The respective unit pictures 10 are not overlapped with each other. In other words, the unit pictures 10 are separated from each other. The partial picture memory 2 has a region which is larger than that of the display memory 5 by at least one unit picture in upper or lower and right or left directions, and the size thereof is always an integral multiple of the unit picture 10. The region of the display memory 5 is determined by the display 6. In this embodiment, the size of the display memory 5 depends on a display capability of the bit map display 6. According to the structure of this embodiment, the size of the unit picture 10 is 512×512 pixels, that of the partial picture memory 2 is 5×4 unit pictures (2560×2048 pixels), and that of the display memory 5 is 1280×1024 pixels.

Referring to FIGS. 3 to 10, the operation of the above-structured apparatus of this embodiment is explained.

First of all, the operation in which the display position of the large scale picture 9 is continuously scrolled in the direction shown in FIG. 3 will be explained.

Figure 3:
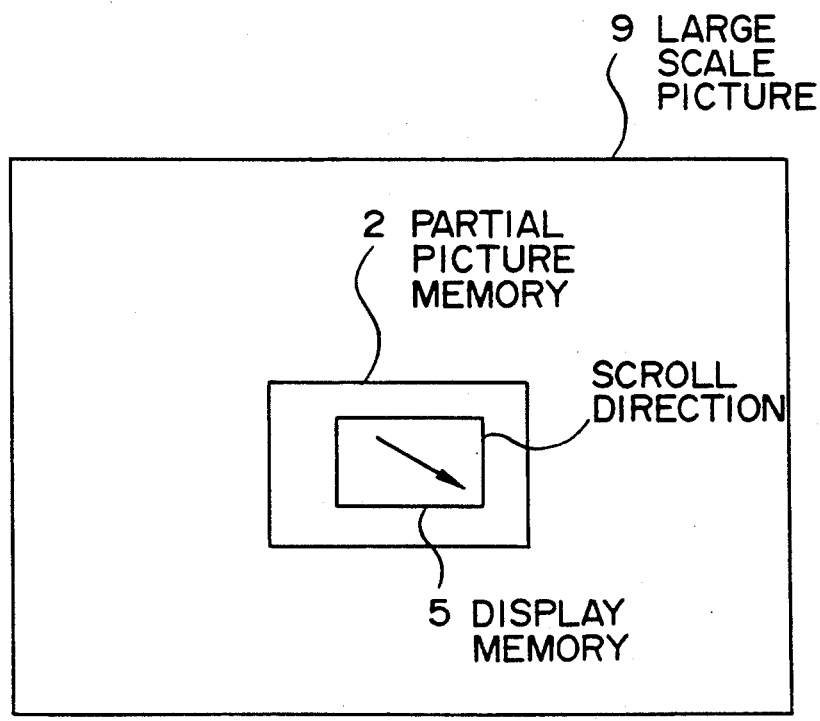
FIG. 3 is a view showing a relationship between a scroll direction and a partial picture memory.

As shown in FIG. 3, in a case where the range of the display memory 5 is within the picture range of the partial picture memory 2, picture data of the partial picture memory 2 is shifted a little by little, for example, 16 dots by 16 dots, and copied to the display memory 5, thereby enabling to scroll the picture data.

In a case where the range of the display memory 5 exceeds the range of the partial picture memory 2, the following operation may be performed.

Figure 4:
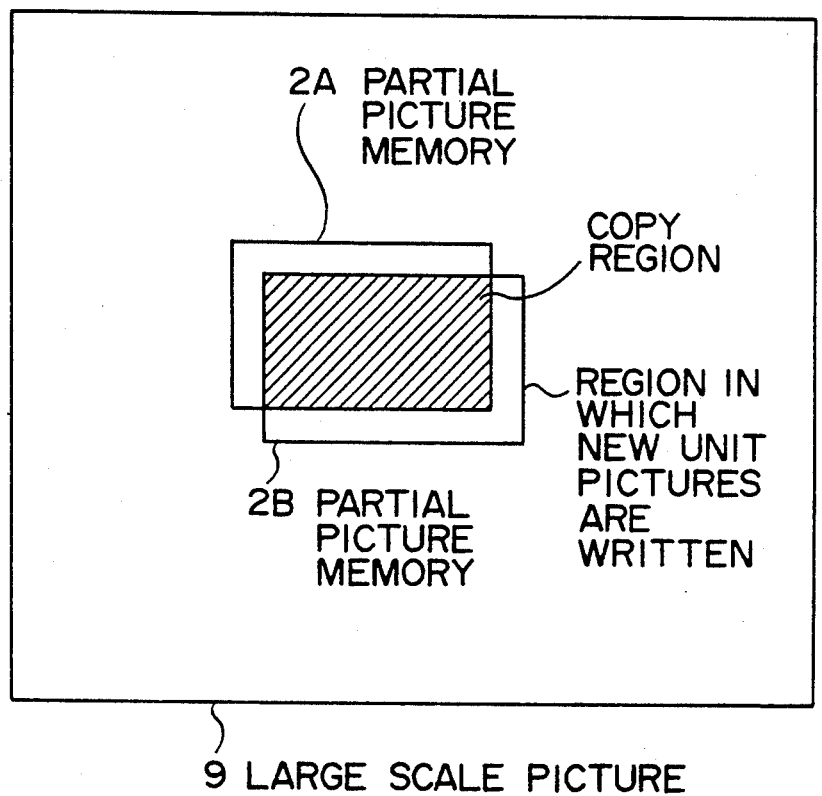
FIG. 4 is a view explaining a change between the partial picture memories.

The partial picture memory, which is presently used, is called "partial picture memory 2A." FIG. 4 shows the range of the picture data stored in the partial picture memory 2A. At the time when the scrolled and displayed range becomes near to the boundary of partial picture memory 2A, for example, 32 dots up to the boundary of the partial picture memory 2A, a new partial picture memory 2B, which is obtained by shifting (i.e., parallel trans) the region of the partial picture memory 2A in the scroll direction by a region corresponding to, for example, the unit picture, is reserved in an imaginary memory space of the computer. Then, the overlapping region of the partial picture memories 2A and 2B is calculated by geometrical calculation means 3. Moreover, picture data of the partial picture memory 2A corresponding to the overlapping region (slant lines in FIG. 4) is copied to the partial picture memory 2B from the partial picture memory 2A. At this time, the overlapping region of the partial picture memory 2A and the partial picture memory 2B can be obtained by performing the following geometrical calculation by geometrical calculation means 3.

The region of the partial picture memory 2 is expressed by a two-dimensional coordinate system wherein the unit picture 10 is used as a unit. In other words, the region of the partial picture memory 2 is designated by a relative position of the original point of the partial picture memory with regard to the original point of the large scale picture 9, and the size of the partial picture memory 2, that is, the width and height of the partial picture memory 2. For example, it is assumed that the position of the partial picture memory 2A and the size thereof are (x1, y1) and (w1, h1), respectively, and the position of the partial picture memory 2B and the size thereof are (x2, y2) and (w2, h2), respectively.

Figure 5:
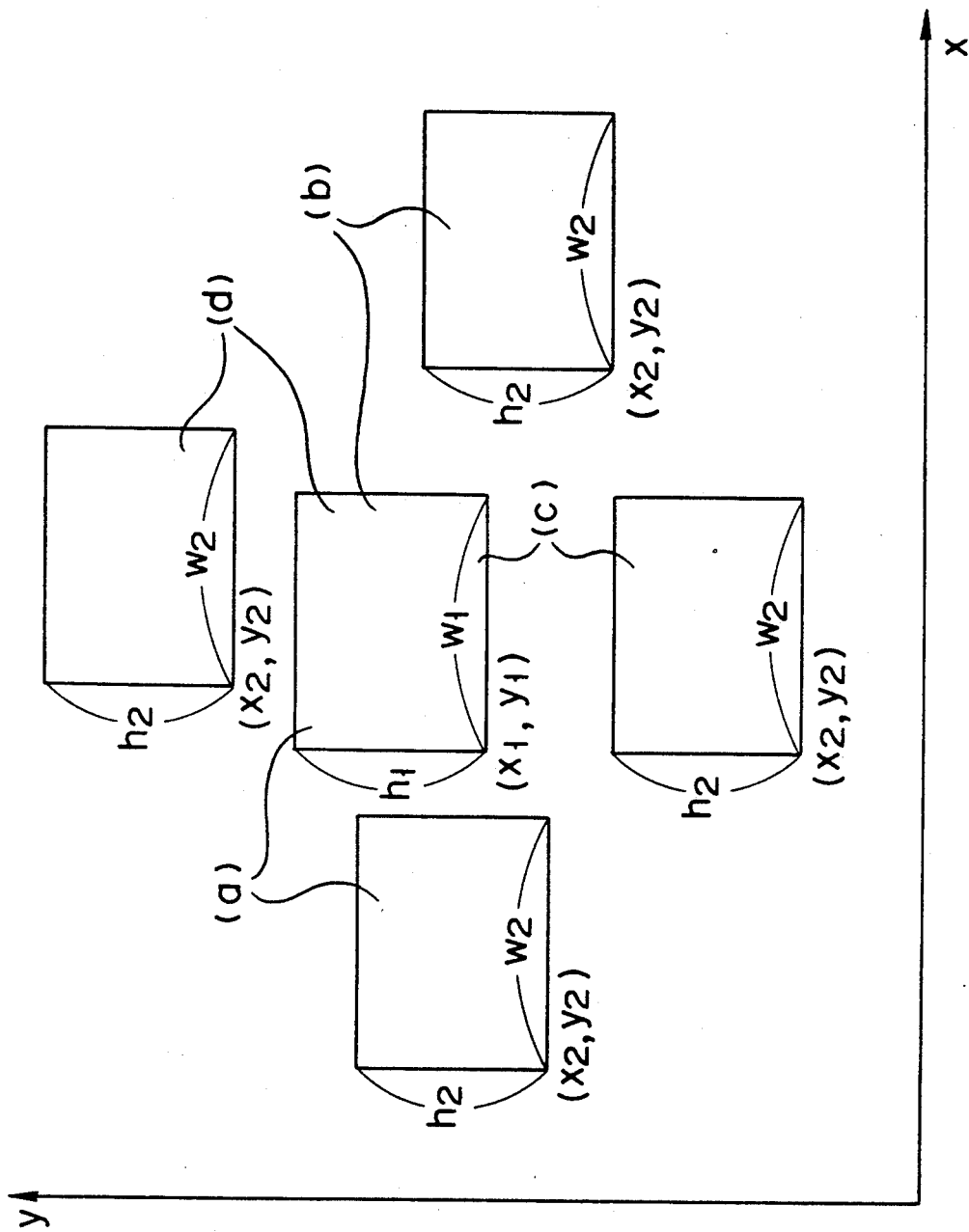
FIG. 5 is a view showing a positional relationship when there is no overlapping region between the partial picture memories.

If $x1>x2$, and $x1>x2+w2$, the partial picture memory 2A and the partial picture memory 2B are not overlapped each other as shown in (a) of FIG. 5.

If $x2>x1$, and $x2>x1+w1$, the picture partial memory 2A and the partial picture memory 2B are not overlapped each other as shown in (b) of FIG. 5.

If $y1>y2$, and $y1>y2+h2$, the partial picture memory 2A and the partial picture memory 2B are not overlapped each other as shown in (c) of FIG. 5.

If $y2>y1$, and $y2>y1+h1$, the partial picture memory 2A and the partial picture memory 2B are not overlapped each other as shown in (d) of in FIG. 5.

Figure 6:
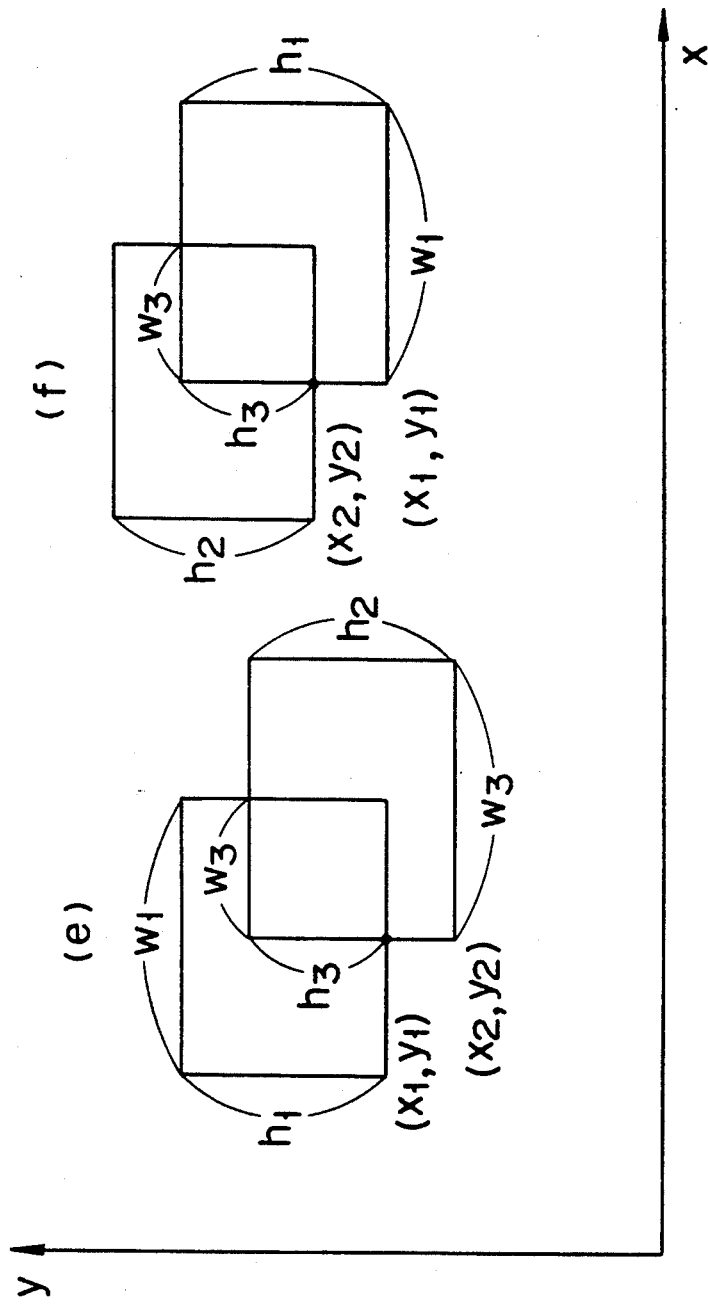
FIG. 6 is a view showing a method for displaying an overlapping region between the partial picture memories.

If $x1<x2$, x-coordinate and the width w of the overlapping region of the partial picture memory 2A and the partial picture memory 2B are expressed by $x3=x2$, $w3=x1+w1-x2$, as shown in (e) of FIG. 6.

If $x2<x1$, x-coordinate and the width w of the overlapping region of the partial picture memory 2A and the partial picture memory 2B are expressed by $x3=x1$, $w3=x2+w2-x1$, as shown in (f) of FIG. 6.

If $y1<y2$, y-coordinate and the height h of the overlapping region of the partial picture memory 2A and the partial picture memory 2B are expressed by $y3=y2$, $h3=y1+h1-y2$, as shown in (e) of FIG. 6.

If $y2<y1$, y-coordinate and the height h of the overlapping region of the partial picture memory 2A and the partial picture memory 2B are expressed by $y3=y1$, $h3=y2+h2-y1$, as shown in (f) of FIG. 6.

Therefore, the position of the overlapping region and the size thereof are expressed by (x3, y3) and (w3, h3).

Picture data of the partial picture memory 2A in this region is copied to the partial picture memory 2B from the partial picture memory 2A by raster control means 4.

Figure 7:
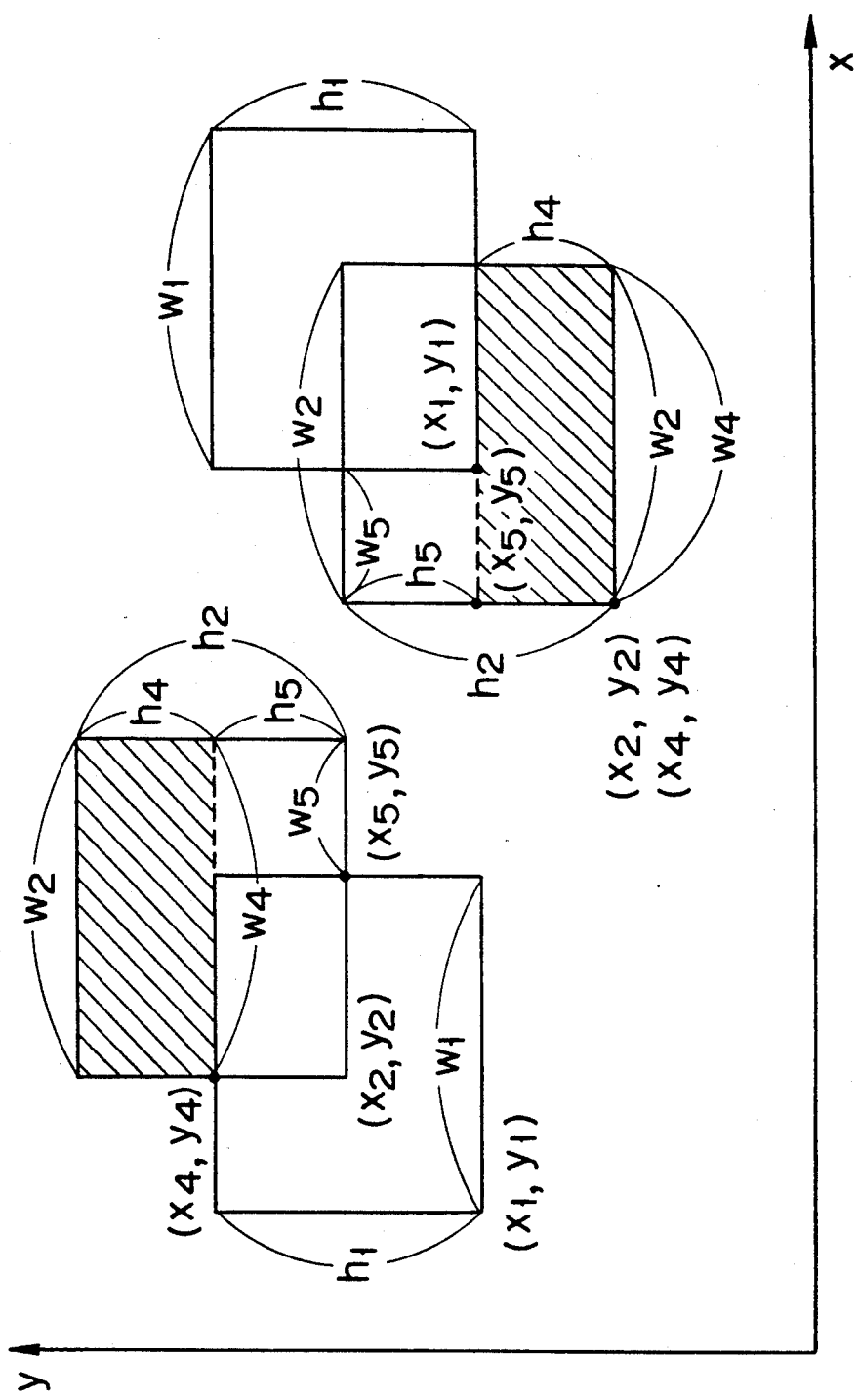
FIG. 7 is a view showing a method for displaying non-overlapping region of a second partial picture memory.

The portion of the partial picture memory 2B, which is not included in the partial picture memory 2A, is calculated by geometric calculation means 3 as explained below. This portion is expressed by the two regions, that is, position (x4, y4), size (w4, h4), and position (x5, y5), size (w5, h5). These positions (x4, y4) and (x5, y5) and sizes (w4, h4) and (w5, h5) are expressed as follows:

If $x1<x2$, $x4=x2$, $x5=x1+w1$, $w4=w2$, and $w5=x2+w2-x1-w1$ as shown in (g) of FIG. 7.

If $x2<x1$, $x4=x2$, $x5=x2$, $w4=w2$, and $w5=x1+w1-x2-w2$ as shown in (h) of FIG. 7.

If $y1<y2$, $y4=y1+h1$, $y5=y2$, $h4=y2+h2-h2$ $y1-h1$, and $h5=y1+h1-y2$ as shown in (g) of FIG. 7.

If $y2<y1$, $y4=y2$, $y5=y1$, $h4=y1+h1-y2-h2$, and $h5=y2+h2-y1$.

By use of address data of the large scale picture 9, which the unit picture search means 7 has, the unit pictures 10 corresponding to two regions is searched by unit picture search means 7. In this case, the search of the unit pictures 10 is easily performed based on the two-dimensional coordinate of the above-mentioned large scale picture 9 wherein each unit picture 10 is used as a unit. The searched unit picture is newly read out from the picture memory device 1 under the control of picture memory control means 8, and stored into the partial picture memory 2B thereunder.

For example, x-coordinate and y-coordinate of the unit picture 10, which is included in the region expressed by position (x, y) and size (w, h), range from x to x+w and from y to y+h on the coordinate of the large scale picture 9, respectively. Therefore, if a file name of the unit picture 10 is expressed by I. x. y, and x and y indicate coordinate values, a desired unit picture 10 can be simply read out from the picture memory device 1.

Figure 8:
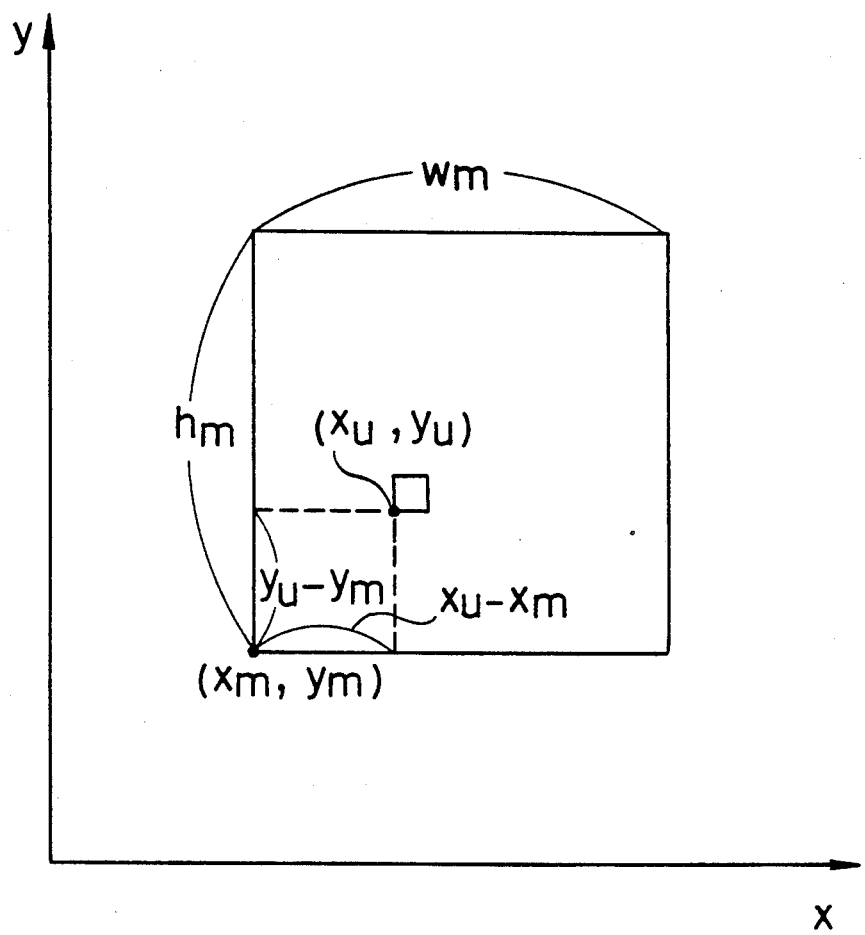
FIG. 8 is a view showing a method for expressing the position of the unit picture in the second partial picture memory.

Moreover, as shown in FIG. 8 if the region of the partial picture memory 2B is expressed by position ($x_m$, $y_m$) and size ($y_m$, $h_m$), and the coordinate of the unit picture 10 is expressed by ($x_u$, $y_u$), the storing place of the unit picture 10 is expressed by the relative position ($x_u-x_m$, $y_u-y_m$) from the original point of the partial picture memory 213.

According to the above-mentioned method, a part of the large scale picture 9, which is, for example, shifted by one unit picture in the scroll direction from the region of the partial picture memory 2A, can be formed on the newly reserved partial picture memory 2B.

At the time when the display range deviates from the region of the partial picture memory 2A, picture data of the partial picture memory 2B is copied to the display memory 5, and the displayed picture is changed to the picture of the partial picture memory 2B from that of the partial picture memory 2A by picture memory control means 8. Then, the unnecessary partial picture memory 2A is released.

Thereafter, the above steps are repeatedly performed, thereby making it possible to continuousy scroll the entire region of the large scale picture.

FIG. 9 is a flow chart showing the above-mentioned scrolling steps. When the scrolling is started, it is discriminated whether or not picture data to be scrolled is in the partial picture memory 2A, which is presently displayed, in STEP 50. If picture data to be scrolled is in the region of the partial picture memory 2A, the display range is moved and scrolled in STEP 52. If picture data is not in the partial picture memory 2A, the operation in mode is changed from the partial picture memory 2A to the partial picture memory 2B in STEP 51 and scroll-displaying is continued in STEP 52.

FIG. 10 is a flow chart showing that the operation in mode is changed from the partial picture memory 2A to the partial picture memory 2B. In FIG. 10, if the display region of the partial picture memory 2A, which is presently scrolled, is near the boundary thereof, a new partial picture memory 2B in which the predetermined unit pictures 10 in the scroll direction are added is reserved in STEP 60. Then, in STEP 61, the overlapping portion of the partial picture memory 2A and the partial picture memory 2B is copied to the partial picture memory 2B from the partial picture memory 2A. Further, in STEP 62, the unit pictures 10 of the unoverlapping portion are read into the partial picture memory 2B from the picture memory device 1. Thereafter, in STEP 63, the operation mode of the partial picture memory is changed from the partial picture memory 2A to the partial picture memory 2B, and the old partial picture memory 2A is released in STEP 64.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for continuously scrolling a large scale picture, comprising the step of:

extracting a first partial picture of a part of the large scale picture from picture memory means storing a plurality of unit pictures, which form the large scale picture and are respectively corresponded to predetermined addresses;

storing the first partial picture into a first partial picture memory means, said first partial picture having a region with a first position and a first size, which are relatively defined based on orthogonal coordinate axes of said large scale picture;

reserving second partial picture memory means for storing a second partial picture having a second position and a second size, which are relatively defined based on the orthogonal coordinate axes of the large scale picture, said second position of said second partial picture being defined by parallel translation of said first position of said first partial picture, said second partial picture having a region overlapping said first partial picture;

calculating a position and a size of the region where said first and second partial picture overlap each other, and those of a region where said first and second partial picture do not overlap each other;

copying picture data of said first partial picture memory means corresponding to the region where said first and second partial pictures overlap each other, to a corresponding region of said second partial picture memory means;

searching the unit pictures forming the region of said second partial picture which does not overlap said first picture based on the respective addresses of the plurality of the unit pictures forming said large scale picture;

storing the searched unit pictures to the corresponding position of said second partial picture memory means and operating said second partial picture memory means in which all picture data to be stored are stored, in place of the operation of said first partial picture memory means; and displaying the content of said second partial picture memory means, thereby continuously scrolling the large scale picture.

2. An apparatus for continuously scrolling a large scale picture, comprising:

picture memory means for dividing the large scale picture into a plurality of unit pictures, and storing the plurality of unit pictures to the respective predetermined addresses;

first partial picture memory means for storing a first partial picture of a part of the large scale picture formed by said unit pictures, said first partial picture having a first position and a first size, which are relatively defined based on orthogonal coordinate axes of the large scale picture;

second partial picture memory means for storing a second partial picture having a second position and a second size, which are relatively defined based on the orthogonal coordinate axes of the large scale picture, said second position of said second partial picture being defined by parallel translation of said first position of said first partial picture, said second partial picture having a region overlapping said first partial picture;

geometrical calculation means for calculating the position and the size of the region where said first and second picture overlap each other, and those of the region where said first and second picture do not overlap each other;

copy means for copying picture data of said first partial picture memory means corresponding the region where said first and second partial picture overlap each other to a corresponding region of said second partial picture memory means;

search means for searching the unit pictures forming the region of said second partial picture which does not overlap said first partial picture based on the respective addresses of the plurality of the unit pictures forming said large scale picture;

picture memory control means for storing the searched unit pictures to the position corresponding to said second partial picture memory means and controlling said second partial picture memory means, in which all picture data to be stored are stored, to be set in an operation mode in place of the operation of said first partial picture memory means; and display means for displaying either the content of said first picture memory means or that of said second partial picture memory means, thereby continuously scrolling the large scale picture.

3. The scrolling apparatus according to claim 2, wherein said picture control means stores addresses of the unit picture included in said first and second partial picture memory means in the form of table.

4. The scrolling apparatus according to claim 2, wherein said unit picture search means stores address data of said large scale picture.

5. The scrolling apparatus according to claim 2, further comprising display frame means for storing a part of picture data of either said first or second partial picture memory means, and sequentially sending said data to the display means.

* * * * *